April 11, 1933.     C. A. SCHACHT     1,903,690
SLIDING CASTER CUP
Filed April 30, 1932
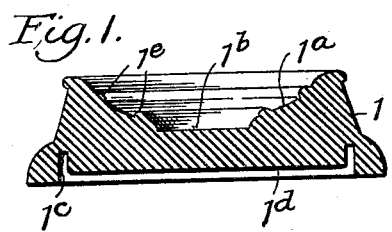
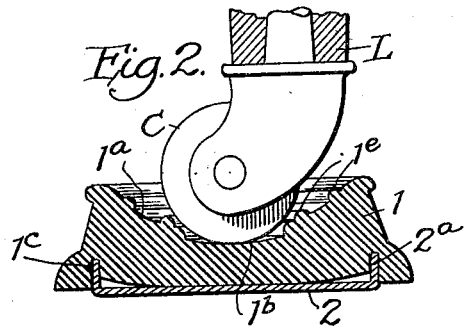
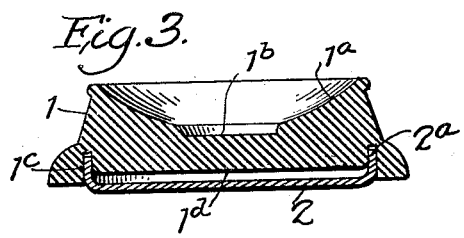
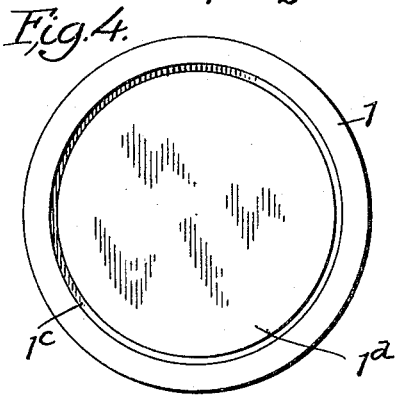
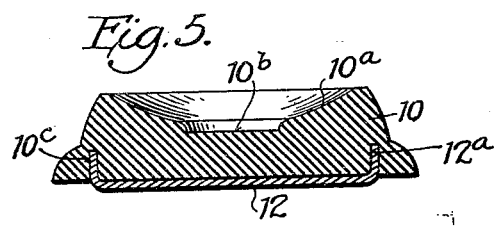
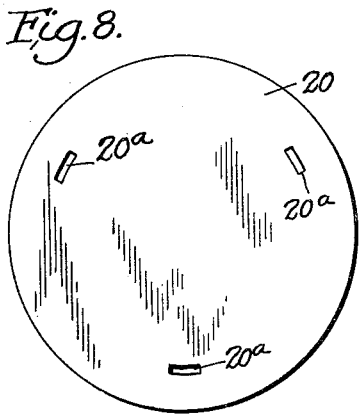
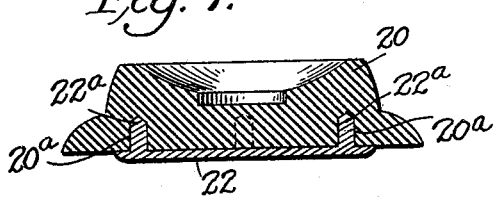
Inventor
Clifford A. Schacht
By Alexander Duell
Attorney Patented Apr. 11, 1933

1,903,690

UNITED STATES PATENT OFFICE

CLIFFORD A. SCHACHT, OF HUNTINGTON, INDIANA

SLIDING CASTER CUP

Application filed April 30, 1932. Serial No. 608,519.

This invention is a novel improvement in caster cups such as shown in my co-pending application Serial No. 543,191, filed June 9, 1931, subsequently issued as Patent No. 1,861,095, May 31, 1932; and the principal object of the invention is to provide a caster cup adapted to be used on furniture of all kinds such as beds, desks, etc., whether provided with casters in the legs of the furniture, or without casters, my novel caster cup receiving either the caster or the end of the furniture leg itself seated in the recess therein.

Caster cups have heretofore been made of glass, but have not proven very satisfactory since the glass breaks after short use; and have also been made of wood, but are nevertheless unsatisfactory since wood will not readily slide on a floor; also caster cups have been made of rubber but since the rubber, like the wood, will not readily slide, such cups are also unsatisfactory.

My improved caster cup consists of a recessed rubber body provided with a readily removable shell composed of stiff material of a slidable nature, such as metal, glass, wood, or bakelite, whereby when the shell is attached to the rubber body a sliding surface is provided therefor, and when the slidable shell is detached from the rubber body the rubber will constitute a non-slidable cup. Moreover the recesses in my rubber insert may be provided with means for setting up friction for preventing the caster wheels from rolling out of the caster cups when the furniture is moved.

Other minor objects will be hereinafter set forth.

I will explain the invention with reference to the accompanying drawing which illustrates several practical embodiments thereof to enable others familiar with the art to adopt and use the same; and will summarize in the claims the novel features of construction, and novel combinations of parts, for which protection is desired.

In said drawing:

Fig. 1 is a vertical section through one form of all-rubber caster cup with the slidable shell removed.

Fig. 2 is a similar section showing a caster wheel resting in the cup.

Fig. 3 is a section similar to Fig. 2 with the caster wheel removed from the cup.

Fig. 4 is a bottom plan view of the rubber body.

Fig. 5 is a vertical section through a modified form of caster cup and shell.

Fig. 6 is a vertical section through a further modified form of rubber body, with the shell removed.

Fig. 7 is a view similar to Fig. 6 showing the sliding shell attached.

Fig. 8 is a bottom plan view of the caster cup shown in Fig. 6.

As shown in Figs. 1 and 4, the caster cup comprises a resilient body 1 preferably of molded rubber or other yieldable material having a substantially truncated conical form, the body being provided with a relatively wide and shallow recess 1a in its upper or smaller end, the recess 1a being slightly deepened at its center as at 1b and forming a pocket for receiving the caster wheel C on the furniture leg L in the usual manner.

In the bottom or larger face of the rubber body 1 is a relatively deep and narrow annular recess 1c molded in the body and the central portion 1d of the bottom face of the body, bounded by the recess 1c, is preferably molded on a slightly higher plane than the margin of the bottom face so that a slight vacuum will be set up to prevent slipping of the caster when the caster wheel or furniture leg is inserted in the recess 1a. The recess 1c is adapted to receive a cup shaped shell 2 of hard slidable material such as metal, bakelite, glass, or wood, the shell 2 being of exterior diameter to suit the diameter of the annular recess 1c into which the shell is removably inserted as shown in Figs. 2 and 3, and when inserted will be retained in the recess by the resiliency of the rubber and by the slight vacuum created between the shell 2 and the bottom 1d of the cup. The height of the flange 2a of the shell 2 in Figs. 2 and 3 is made greater than the depth of recess 1c whereby the central portion 1d of the rubber body bounded by the recess 1c will normally not touch the shell 2 as in Fig. 3, but when the caster roller C is placed in the cup as in Fig. 2 the rubber will yield downwardly at the center directly under the roller C and will stretch the rubber and will set up friction so that the caster wheel C can not readily roll out of the recess 1a.

In Fig. 5 the body 10 and shell 12 are substantially the same as in Fig. 3, and the body 10 has the recess 10a and deepened portion 10b and has the annular recess 10c in its bottom. This cup 10 however has no raised portion within the recess 10c (as 1d in Fig. 3) and the height of the flange 12a of the shell 12 is substantially equal to the depth of the annular recess 10c. The shell 12 will be removably retained in position on the cup 10 by the resiliency of the rubber contacting with the flange 12a of the shell.

By the above construction the rubber body 1 or 10 is molded in one piece with the recess 1c or 10c, and the body as it comes from the mold can be used without the shell 2 or 12 as a nonsliding caster cup. The metal, or other sliding shell 2 or 12 when attached to the rubber body provides a sliding cup. When the caster wheel C is seated in the recess 1a or 10a the flange of the shell 2 or 12 will keep the rubber from warping out of shape when the weight is on the cup. No screws or bolts of any kind are required to hold shell on the cup.

The shell 2 or 12 is slightly rounded at its periphery so that when the cup is pushed over the floor it will not catch on any uneven parts of the floor. If desired corrugations 1e (Figs. 1 and 2) could be molded in the recess 1a to enhance the cup and to further prevent the caster wheel C from rolling out of the recess.

In Figs. 6 to 8 a modified form of molded rubber caster cup is shown in which the rubber body 20 is substantially the same as that shown in Figs. 1 to 5, but the deep annular recess in the bottom of the rubber body is omitted. In place of the annular recess, a plurality of relatively deep vertical bores 20a extend upwardly into the rubber from the lower face of the bores, three such bores being shown spaced approximately 120° apart and on the same pitch circle. The bores 20a are adapted to receive upwardly extending prongs 22a on a removable plate 22, the prongs entering the bores and being retained therein by the resiliency of the rubber. Obviously the plate 22 may be readily removed from the body 20 by prying the same loose, and when so removed the rubber body 20 alone will constitute a non-sliding caster cup.

The cups can be made of different sizes, and different size sliding plates can be used in connection therewith.

I claim:

1. A caster cup comprising a relatively flat rubber body having a relatively shallow recess in its top for loosely receiving a furniture leg and having a recess in its bottom; and a glide of hard material below the cap having portions removably engaged with the bottom recess and retained therein by the resiliency of the rubber.

2. In a caster cup as set forth in claim 1, said bottom recess comprising a relatively deep and narrow annular groove coaxial with the axis of the cup; said glide being cup-shaped and having its sides entering the groove.

3. In a caster cup as set forth in claim 1, said bottom recess comprising a relatively deep and narrow annular groove coaxial with the axis of the cup, said glide being cup-shaped and having its sides entering the groove; the sides of the cup being of greater height than the depth of the groove.

4. In a caster cup as set forth in claim 1, said bottom recess comprising a relatively deep and narrow annular groove coaxial with the axis of the cup, said glide being cup-shaped and having its sides entering the groove; the bottom of the body within the groove being molded on a higher plane than the margin exterior to the groove.

5. In a caster cup as set forth in claim 1, said glide having an upstanding pin engaging the bottom recess.

6. A sliding caster cup comprising a relatively flat rubber body having a relatively shallow recess in its upper portion for loosely receiving a furniture leg and means in the recess for frictionally preventing the leg from sliding out of said recess; and a glide of hard material on the bottom of the cup having portions removably engaged with a recess in the bottom of the cup and retained therein by the resiliency of the rubber.

7. In a caster cup as set forth in claim 6, said bottom recess comprising a relatively deep and narrow annular groove coaxial with the axis of the cup, said glide being cup-shaped and having its sides entering the groove.

8. In a caster cup as set forth in claim 6, said bottom recess comprising a relatively deep and narrow annular groove coaxial with the axis of the cup, said glide being cup-shaped and having its sides entering the groove; the sides of the cup being of greater height than the depth of the groove.

9. In a caster cup as set forth in claim 6, said bottom recess comprising a relatively deep and narrow annular groove coaxial with the axis of the cup, said glide being cup-shaped and having its sides entering the groove; the bottom of the body within the groove being molded on a higher plane than the margin exterior to the groove.

10. In a caster cup as set forth in claim 6, said glide having an upstanding pin engaging the bottom recess.

11. A sliding caster cup comprising a relatively flat rubber body having a relatively shallow recess in its upper portion for loosely receiving a furniture leg, and said cup having a circular recess in its bottom portion; and having a relatively deep narrow annular groove at the periphery of the bottom recess; a removable glider cup on the bottom of the caster cup having its sides engaged with the groove and retained therein by the resiliency of the rubber.

12. In a caster cup as set forth in claim 11, the sides of the cup being of greater height than the depth of the groove.

13. A caster cup having a relatively flat rubber body having a substantially shallow recess in its top for loosely receiving a furniture leg and having spaced upwardly extending bores in its bottom, a glide of hard material below the cup having upstanding pins engaging the bores, said pins being retained therein by the resiliency of the rubber.

14. A sliding caster cup comprising a relatively flat rubber body having a relatively shallow recess in its upper portion for loosely receiving a furniture leg and having means in the recess for frictionally preventing the leg from sliding out of the recess; and a glide of hard material along the bottom of the cup having upstanding pins removably engaged with upwardly extending bores in the bottom of the cup, said pins being retained in the bores by the resiliency of the rubber.

CLIFFORD A. SCHACHT.